United States Patent [19]
Dietzel

[11] Patent Number: 5,802,816
[45] Date of Patent: Sep. 8, 1998

[54] PROCESS FOR THE PRODUCTION OF A SPECIMEN CARRIER

[75] Inventor: Guenter Dietzel, Straubenhardt, Germany

[73] Assignee: Raytest Isotopenmessgeraete GmbH, Straubenhardt, Germany

[21] Appl. No.: 591,601

[22] PCT Filed: Jul. 6, 1995

[86] PCT No.: PCT/DE95/00906

§ 371 Date: Feb. 9, 1996

§ 102(e) Date: Feb. 9, 1996

[87] PCT Pub. No.: WO96/01692

PCT Pub. Date: Jan. 25, 1996

[30] Foreign Application Priority Data

Jul. 8, 1994 [DE] Germany .......................... 44 24 112.7

[51] Int. Cl.⁶ .............. B65B 47/10; B65B 3/02; B65B 43/54
[52] U.S. Cl. ................................. 53/453; 53/559
[58] Field of Search .............. 53/427, 453, 559, 53/441, 390

[56] References Cited

U.S. PATENT DOCUMENTS

| | | | |
|---|---|---|---|
| 1,387,805 | 8/1921 | Roberts | 53/453 X |
| 2,490,781 | 12/1949 | Cloud | 53/453 |
| 2,597,986 | 5/1952 | Halstead | 53/453 |
| 2,949,713 | 8/1960 | Vogt | 53/453 |
| 3,104,506 | 9/1963 | Rohdin | 53/453 X |
| 3,186,137 | 6/1965 | Eitzen | 53/427 X |
| 3,216,832 | 11/1965 | King | 53/453 X |
| 3,353,325 | 11/1967 | Jensen et al. | 53/453 X |
| 3,410,699 | 11/1968 | Peters | 53/427 X |
| 3,950,919 | 4/1976 | Perdue | 53/427 X |
| 5,081,819 | 1/1992 | Cloud | 53/453 |

*Primary Examiner*—Horace M. Culver
*Attorney, Agent, or Firm*—McAulay Fisher Nissen Goldberg & Kiel, LLP

[57] ABSTRACT

The described invention is directed to a process and a device for the production of a specimen carrier (18) and to the specimen carrier (18) itself An easily manageable specimen carrier (18) for the measurement of tagged specimens (19) is produced by a device by means of a more economical process in which the detection sensitivity of $C^{14}$ β-radiation is substantially improved. A specimen carrier (18) of this kind with specimen locations (8) which are enclosed on all sides by sheets (2, 20) is provided in that a sheet (2) is provided with depressions (3), a specimen (19) is placed in each of these depressions (3), a second sheet (20) is placed upon the sheet (2) carrying the specimens (19) and/or the sheets (2, 20) are connected with one another (see FIG. 1).

9 Claims, 2 Drawing Sheets

PROCESS FOR THE PRODUCTION OF A SPECIMEN CARRIER

BACKGROUND OF THE INVENTION a) Field of the Invention

The invention is directed to a process and a device for the production of a specimen carrier having a plurality of individual specimen locations for receiving specimens and to the specimen carrier itself.

b) Description of the Related Art

Specimen carriers with a plurality of specimen locations are used in blood group serology, for antibiotics test series, and further for laboratory work requiring geometric dilution series. Specimen carriers of this kind, also called microtitration plates, such as those known from DE GM 88 14 762.2 are designed as injection-molded articles formed of a transparent plastic with a plurality of depressions serving as specimen locations for receiving specimens. The specimens are placed in the individual specimen locations manually or automatically by pipetting and are freeze-dried or volatilized.

The production of the known specimen carriers, which are also frequently constructed in multiple parts, requires great precision in carrying out the injection molding process and a careful final inspection since the specimen carriers are precision parts. Moreover, elaborate sanitary measures are required for production and storage in order to avoid contaminating the specimen carriers and to prevent errors in subsequent series of measurements.

Further, the measurement of $C^{14}$-tagged specimens by means of radioluminography image plates has proven extremely difficult with the known specimen carriers. The $C^{14}$ β-radiation to be measured does not penetrate the base or wall of known specimen carriers. Therefore, the image plate can only be exposed at the open top. The disadvantage in such a process consists in that the specimen locations which are open at the top are covered by the image plate and measurements may be falsified as a result of reactions between the image plate and the specimen.

In particular, it has proven extremely difficult to measure $C^{14}$-tagged specimens by means of radioluminography image plates in the known specimen carriers when the specimen volume is small. In microbore HPLC (High Pressure Liquid Chromatography), specimen volumes are approximately 1–50 microliters or 1–100 nanoliters in capillary electrophoresis. These small quantities make exposure of the image plate at the open top considerably more difficult.

OBJECT AND SUMMARY OF THE INVENTION

The present invention has a primary object of providing, by means of a more economical process, an easily manageable specimen carrier for the measurement of tagged specimens, especially also those having a small specimen volume, in which the detection sensitivity of $C^{14}$ β-radiation is substantially improved and is directed to the process and a device for producing the specimen carrier as well as the specimen carrier itself.

Costly molds for injection-molded articles are eliminated by means of the process according to the invention for producing a specimen carrier for carrying out the object in which a) a sheet is provided with a plurality of individual depressions;

b) a specimen is placed in each of these depressions;

c) a second sheet which covers the specimens is placed upon the sheet carrying the specimens;

d) and/or the sheets are connected with one another.

Further, a commercially obtainable sheet is used in an economical manner as starting material for the production of a specimen carrier which is closed on all sides so that its use cannot result in reactions between the specimen material and the environment which lead to falsified measurements. Suitable selection of the dimensions of the depressions to be produced enables individual and flexible adaptation to the measurements to be taken.

These depressions are advantageously produced in that the sheet is brought into contact with a support having voids or negative molds of the depressions, in that the negative molds are subsequently evacuated, the depressions being formed by the air pressure in the sheet in conformity to the negative molds. When commercially available thin sheets are used, these sheets lie flat against the surface of the negative molds after evacuation is effected so that individual specimen locations of exactly defined dimensions are formed. According to the invention, after the depressions are produced, the evacuation of the negative molds is maintained for the subsequent process step b) and the vacuum pressure created by the evacuation is canceled prior to process step c) while the sheet remains on the support.

These steps ensure simple handling in that the specimen locations remain dimensionally stable also during the pipetting process. After the pipetting process and elimination of the vacuum pressure, the specimen locations are covered with a second sheet or with surplus from the first sheet and the sheets can be glued together. This produces a specimen carrier for a plurality of specimens in the form of a closed, planar envelope.

According to another feature of the invention, the negative molds which are connected via conduits communicate with one another and are evacuated or relieved of vacuum pressure simultaneously via a collecting line having a valve. In this way, all depressions can be produced quickly in a simple manner by means of only one evacuation device. After the evacuation, the vacuum pressure can also be maintained for the subsequent process steps after the evacuation device has been disconnected by closing the valve.

In particular, the invention substantially facilitates the placement of liquid specimens in the depressions of the sheet and subsequent volatilization of the solvent, since volatilization of the solvent is enabled by freeze-drying or evaporation.

According to the invention, a transparent sheet having a thickness between 1 μm and 3 μm, preferably 2 μm, is used. Such a sheet offers only a negligible resistance, if any, to $C^{14}$ β-radiation which is to be evaluated. Accordingly, $C^{14}$-tagged specimens can be measured very accurately by means of radioluminography image plates.

A sheet which satisfies these requirements is sold, e.g., under the trade name Hostaphan by Farbwerke Hoechst AG.

The specimen carrier, according to the invention, having a plurality of individual specimen locations for receiving specimens has specimen locations which are enclosed on all sides by one or more sheets. Naturally, no reactions can take place between the specimens and the environment in a specimen carrier of this kind so that it is extremely simple to handle. Moreover, it is especially suitable for holding tagged specimens for measurement by radioluminography image plates, since it is possible to cover the specimen carrier on two sides with radioluminography image plates. In this way, the specimens are brought into an extremely favorable position for measuring radioactivity with low self-absorption-evaporation of solvent.

In order to place the specimens on a specimen carrier according to the invention via pipette in a simple and reliable manner the sheet advantageously has depressions as specimen locations for receiving specimens, the depressions are covered by a second sheet, and the specimens are enclosed. The sheet is preferably a transparent sheet having a thickness between 1 µm and 3 µm, preferably 2 µm. The depressions prevent the specimens from flowing onto the sheet when pipetting.

The specimen carrier is especially suitable for small specimen volumes in that its height above the specimen locations is between 1 mm and 2 mm. The volume of the depressions is preferably between 1 nL and 1 mL.

For the purpose of producing the specimen carrier according to the invention, the device is provided with a plate-shaped support for the sheet which has a plurality of negative molds which correspond to the specimen locations and which can be evacuated. The negative molds are preferably constructed as funnels having suction openings at their apex and the suction openings are connected, via conduits, with a collecting line having a valve for the purpose of evacuation.

A device of this type ensures a simple and automated production of the specimen carriers by the process according to the invention.

Finally, the support provided in the device is held in a base plate having a free space below the depressions of the support, the suction openings in the depressions being connected with the free space via conduits, and the free space can be evacuated via a collecting line having a valve. The support, including a sheet arranged thereon, and the base plate can be connected to form a manageable unit by means of a frame which can be placed upon the base plate.

The invention is explained by way of example with reference to the drawings.

DESCRIPTION OF THE PREFERRED EMBODIMENTS

Figure 1:
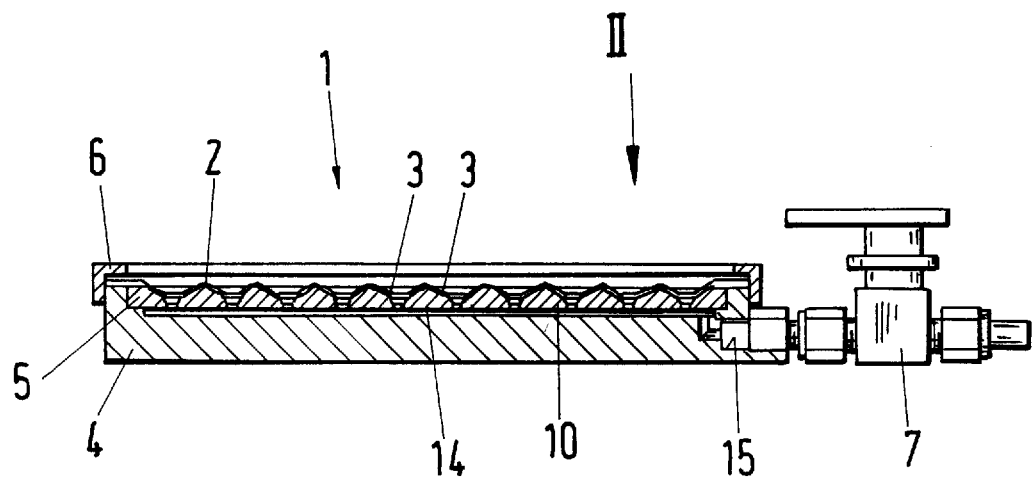
FIG. 1 is a sectional view showing a device for producing a specimen carrier according to the invention.
Figure 2:
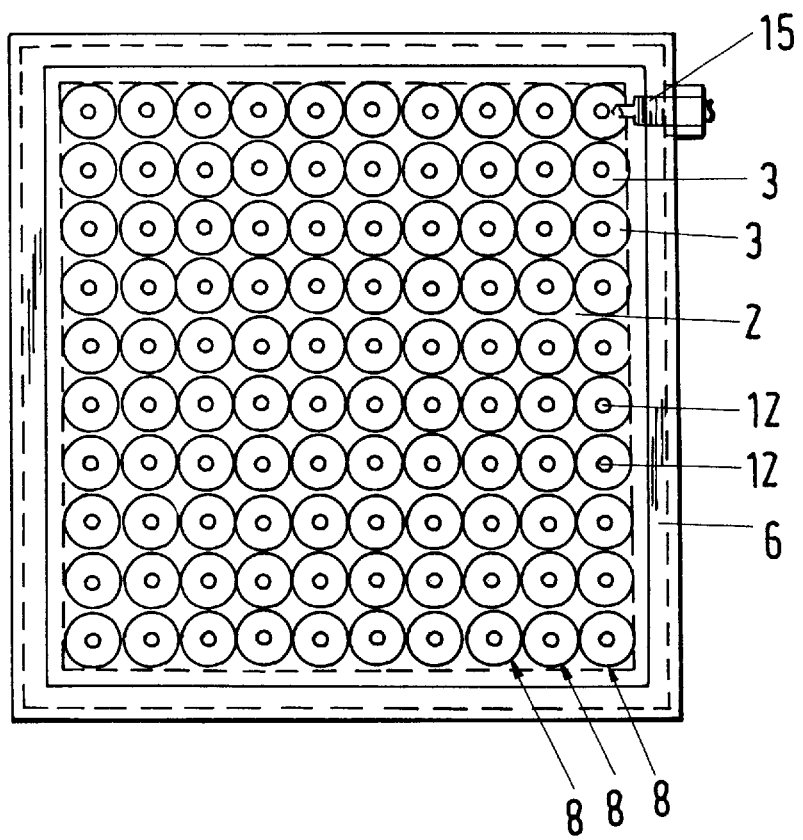
FIG. 2 shows an enlarged section from FIG. 1.
Figure 3:
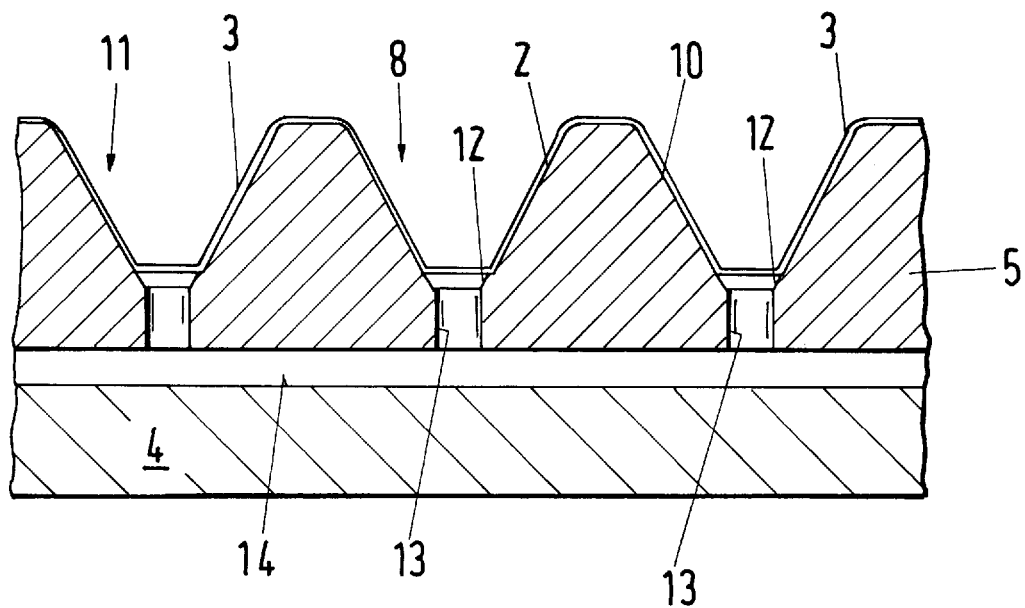
FIG. 3 shows a top view in the direction of arrow II in FIG. 1.
Figure 4:
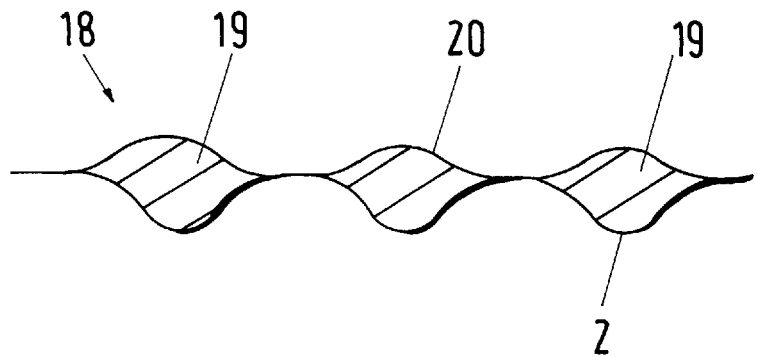
FIG. 4 shows an enlarged section through a finished specimen carrier according to the invention.

FIGS. 1 to 3 show a device 1 for the production of a specimen carrier according to FIG. 4 from a sheet 2 with a plurality of individual depressions 3 for receiving individual specimens 19. The device 1 has a base plate 4 in which is held a support 5 for the sheet 2, a frame 6 which joins the support 5, including the sheet 2 placed thereon, with the base plate 4 to form a manageable unit, and a valve 7 to which an evacuating arrangement, e.g., a pump, not shown, is to be connected. The support 5 is provided with a plurality of negative molds 10 corresponding to specimen locations 8, these negative molds 10 being designed in the present instance as funnels 11. Suction openings 12 which are connected so as to communicate with one another via conduits 13 and a free space 14 provided in the base plate 4 are provided at the apex of the funnels 11. The free space 14 and accordingly the negative molds 10 at the same time are evacuated via a collecting line 15 and the valve 7. In so doing, due to the elasticity of the sheet 2, the sheet 2 contacts the negative molds 10 of the support 5 as is shown in the drawing. When the valve 7 is closed, the entire unit can be transferred to a pipetting device in which the depressions 3 will be provided with the corresponding specimens 19. After the volatilization of a solvent used with the specimens 19, the valve 7 is opened. When the valve 7 is opened, an equalization of pressure takes place, whereupon a second sheet 20 or a surplus portion of sheet 2 is placed over the open specimen locations 8 and connected, e.g., glued or welded, with sheet 2. The specimen carrier 18 can then be removed from the device 1 in order to carry out measurements.

It is also possible to cancel the vacuum pressure by opening the valve 7 only after the second foil has been placed.

In a specimen carrier 18 which is produced in this way, according to FIG. 4, the individual specimens 19 are entirely enclosed by a sheet or sheets (2, 20). The sheets (2, 20) can have a thickness between 1 µm and 3 µm, a thickness of 2 µm being preferred in the present case. The height h of the specimen carrier 18 above the specimen locations 8 is between 1 mm and 2 mm and the volume of the depressions is between 1 nL and 1 mL for capillary electrophoresis or microbore HPLC.

While the foregoing description and drawings represent the present invention, it will be obvious to those skilled in the art that various changes may be made therein without departing from the true spirit and scope of the present invention.

What is claimed is:

1. A process for the production of a specimen carrier having a plurality of individual specimen locations therein for receiving specimens in a solvent comprising:
    a) contacting a first sheet with a support having a plurality of depressions therein, each said depression being in communication with a means for applying a vacuum thereto and means for releasing a vacuum therein;
    b) applying a vacuum to the depressions to draw the first sheet into the depressions and create a series of depressions in the first sheet corresponding to the depressions in the support;
    c) placing a specimen in a solvent therefor in each of the depressions in the first sheet;
    d) removing the solvent from the specimens;
    e) placing a second sheet over the depressions having the specimens therein; and
    f) securing the first and second sheets together to encase the specimens in the depressions and between the first and second sheets.

2. The process according to claim 1, wherein the depressions are connected via conduits which communicate with one another and are evacuated or relieved of vacuum pressure simultaneously via a collecting line having a valve.

3. The process according to claim 1, including the step of using transparent sheets having a thickness between 1 µm and 3 µm.

4. The process according to claim 1, wherein each sheet has a thickness of 2 µm.

5. A device for the production of a specimen carrier comprising:
    a sheet with a plurality of individual specimen locations for receiving specimens, for use in the process according to claim 1;
    a plate-shaped support for said sheet having a plurality of depressions which correspond to the specimen locations and which can be evacuated; and wherein the depressions are constructed as funnels having suction openings at their apexes and the support is held in a base plate having a free space below the depressions of the support, the suction openings in the depressions being connected with the free space via conduits, and the free space can be evacuated via a collecting line having a valve.

6. The device according to claim 5, wherein a frame is provided which can be placed upon the base plate and which connects the support, including a sheet arranged thereon, and the base plate to form a manageable unit.

7. A device for the production of a specimen carrier comprising:

a sheet with a plurality of individual specimen locations for receiving specimens, for use in the process comprising the steps of:

contacting a first sheet with a support having a plurality of depressions therein, each said depression being in communication with a vacuum source;

applying a vacuum to the depressions in the support to draw the first sheet into the depressions and create a series of depressions in the first sheet corresponding to the depressions in the support;

placing a specimen in each of the depressions created in the first sheet;

placing a second sheet over the first sheet;

releasing the vacuum; and connecting the first and second sheets together to encase the specimens between the first and second sheets;

a plate-shaped support for said sheet having a plurality of depressions which correspond to the specimen locations and which can be evacuated; and wherein the depressions are constructed as funnels having suction openings at their apexes and the support is held in a base plate having a free space below the depressions of the support, the suction openings in the depressions being connected with the free space via conduits, and the free space can be evacuated via a collecting line having a valve.

8. The device according to claim 7, wherein the suction openings are connected, via conduits, with a collecting line having a valve for the purpose of evacuation.

9. The device according to claim 7, wherein a frame is provided which can be placed upon the base plate and which connects the support, including a sheet arranged thereon, and the base plate to form a manageable unit.

* * * * *